(12) United States Patent
Hao et al.

(10) Patent No.: US 11,661,356 B2
(45) Date of Patent: May 30, 2023

(54) METHOD AND DEVICE FOR REMOVING CHLORIDE ION IN DESULFURIZED WASTEWATER BY ELECTROCHEMICAL COUPLING

(71) Applicant: Taiyuan University of Technology, Taiyuan (CN)

(72) Inventors: Xiaogang Hao, Taiyuan (CN); Xiaoqiong Hao, Taiyuan (CN); Xiao Du, Taiyuan (CN); Zhonglin Zhang, Taiyuan (CN)

(73) Assignee: TAIYUAN UNIVERSITY OF TECHNOLOGY

( * ) Notice: Subject to any disclaimer, the term of this patent is extended or adjusted under 35 U.S.C. 154(b) by 413 days.

(21) Appl. No.: 16/846,709

(22) Filed: Apr. 13, 2020

(65) Prior Publication Data
US 2021/0002151 A1    Jan. 7, 2021
US 2021/0317013 A9    Oct. 14, 2021

(30) Foreign Application Priority Data
Jul. 1, 2019   (CN) .......................... 201910583372.4

(51) Int. Cl.
*C02F 1/28*      (2023.01)
*C02F 1/461*     (2023.01)
(Continued)

(52) U.S. Cl.
CPC .......... *C02F 1/46109* (2013.01); *C02F 1/463* (2013.01); *C02F 2001/46119* (2013.01);
(Continued)

(58) Field of Classification Search
CPC .................. C02F 1/46109; C02F 1/463; C02F 2001/46119; C02F 2004/46142;
(Continued)

(56) References Cited

U.S. PATENT DOCUMENTS 3,756,933 A * 9/1973 Greenberg .............. C02F 1/465
205/756

FOREIGN PATENT DOCUMENTS

CN    105600881    5/2016
CN    107082516    8/2017
(Continued)

*Primary Examiner* — Zulmariam Mendez
(74) *Attorney, Agent, or Firm* — Onello & Mello, LLP

(57) ABSTRACT

A method and device for removing chloride ions in desulfurized wastewater by electrochemical coupling in which the device comprises: an electrolyte tank having a top and a bottom wherein the tank is used as a separator in a separation process and as an electrode regenerator in an electrode regeneration process; two electrodes comprising a hydrogen evolution electrocatalysis function electrode and an electrochemically switched ion exchange (ESIX) function electrode respectively, wherein the electrodes are connected with each other by a wire; two DC circuits having opposite electric field directions and used alternately in the separation process and the electrode regeneration process respectively; the bottom of the electrolyte tank is provided with a purified high-concentration chloride ion wastewater inlet and a flocculation product outlet; the top of the tank is provided with a dechlorination treatment water outlet and a hydrogen collecting port; and, in the electrode regeneration process, the electrolyte tank is connected to an electrode regeneration liquid storage tank through a pump and a pipeline.

10 Claims, 2 Drawing Sheets

(51) Int. Cl.
*C02F 1/463* (2023.01)
*C02F 101/12* (2006.01)
*C02F 103/18* (2006.01)

(52) U.S. Cl.
CPC ............... *C02F 2001/46142* (2013.01); *C02F 2101/12* (2013.01); *C02F 2103/18* (2013.01); *C02F 2201/4617* (2013.01); *C02F 2303/16* (2013.01)

(58) Field of Classification Search
CPC .............. C02F 2101/12; C02F 2103/18; C02F 2201/4617; C02F 2303/16
See application file for complete search history.

(56) References Cited

FOREIGN PATENT DOCUMENTS

| | | | | |
|---|---|---|---|---|
| CN | 107628687 | | 1/2018 | |
| CN | 108298645 | * | 7/2018 | .............. C02F 1/461 |

\* cited by examiner

METHOD AND DEVICE FOR REMOVING CHLORIDE ION IN DESULFURIZED WASTEWATER BY ELECTROCHEMICAL COUPLING

CROSS REFERENCE TO RELATED APPLICATIONS

The present application claims the benefit of priority under 35 USC 119 to Chinese patent application 201910583372.4, filed Jul. 1, 2019, the contents of which are incorporated herein by reference.

TECHNICAL FIELD

The present invention relates to a method and device for removing chloride ions in desulfurized wastewater, and belongs to the technical field of wastewater treatment. The present invention pertains to a technology for treating high-concentration chloride ion wastewater and, in particular, to a coupling system of an electrochemically switched ion exchange (ESIX) method and an electrocatalytic flocculation method.

BACKGROUND

A limestone-gypsum wet flue gas desulfurization technology is widely used in tail gas treatment of an industrial production process due to its advantages of low cost, simple operation and good desulfurization effect, etc. However, the wastewater produced in the desulfurization process contains a large amount of chlorides, sulfate, a variety of heavy metals and suspended solids and other pollutants. Direct discharge of this wastewater can cause environmental pollution and endangers human health. When the desulfurized wastewater is recycled, the concentration of salt (especially chlorides) in the wastewater is high, which leads to serious corrosion of the processing equipment. At present, a chemical precipitation method, which is a commonly used desulfurized wastewater treatment method, requires high maintenance cost and a large amount of chemical agents resulting in a high content of heavy metal elements, which in turn leads to a large number of hazardous wastes. Additionally, the chloride ions cannot be effectively removed. As a result, it is difficult for current desulfurization technology to meet the market application requirements Therefore, the development of new technologies for the treatment of desulfurized wastewater, especially including more efficient removal of chloride ions and heavy metal ions, is highly desirable and has important application value.

In recent years, there have been some novel desulfurized wastewater treatment methods Chinese patent No. CN201510750966.1 discloses a method and system for treating ions in a wet desulfurization system by electrolytic electrodialysis. This method can effectively separate chloride ions in the desulfurization system and convert, by electrolysis, the chloride ions into chlorine for recycling. Valuable byproducts such as calcium hydroxide and hydrogen can be obtained at the same time. However, the process is complex, the cation exchange membranes and anion exchange membranes used in the process are costly, and a foreign reagent (i.e., hydrochloric acid) needs to be added, which further increases the process cost. Chinese patent No. CN107628687A discloses a treatment method for synchronously removing fluoride ions and chloride ions from industrial wastewater. This method includes two stages: precipitation pretreatment by using $Ca(OH)_2$ and $NaAlO_2$ followed by advanced treatment using a biological coagulant. This approach has the advantages of non-toxicity, high efficiency, natural degradation and the like. However, chemical reagents need to be added in the treatment process, and other salt substances are introduced, which is not conducive to re-pumping the treated wastewater into a desulfurization tower for recycling. In addition, biological bacteria are easily inactivated due to the influence of environmental factors. Chinese patent No. CN107082516A discloses a system and treatment method for removing chloride ions in circulating water. The method connects electric adsorption to an electrolytic dechlorination device. After soluble salts in the water are removed by an electric adsorption device, the concentration of chloride ions in the water is continuously increased. A diaphragm electrolysis principle is adopted to electrolyze high-concentration chloride ions in the circulating water. But, in the adsorption process, desalting adsorption is performed only by the action of an electric field, so that there is no selectivity for target ions. In addition, an ion diaphragm used in the electrolysis process is high in cost and the energy consumption of the whole process operation is high. However, an electrochemical coupling technology for removing chlorine and metal ions by using the principle of combining adsorption and flocculation and a related device thereof have never been reported in the literature in this field at present. Under this system, the double action of a cathode and an anode can greatly enhance the treatment effect of chloride ions and metal ions, and this approach is also conducive to reducing the energy consumption of the system at the same time. In addition, high value-added byproducts can also be produced to further enhance the advantages of this approach to the problem.

SUMMARY

The present invention provides a method and device for removing chloride ions in desulfurized wastewater by electrochemical coupling, which achieve efficient recycling and removal of chloride ions.

The present invention is implemented by coupling highly selective adsorption of target chloride ions by an ESIX technology with electrocatalytic hydrogen evolution reaction. After the hydrogen evolution reaction, locally surplus hydroxide ions bond with metal ions and chloride ions in a solution to generate solid flocculation products. The coupling enhancement of reactions of an anode and a cathode reduces the concentration of the chloride ions in wastewater in different ways. The process also generates high-purity hydrogen byproducts, and the concentration of metal ions in the wastewater is also reduced while flocules are generated. This is beneficial to the recycling of the wastewater, is simple to operate, and improves economic and environmental benefits. The ESIX technology makes an electroactive ion exchange function material and a conductive matrix into an electrode, and switches a redox state of the electrode by regulating an electrode potential. As a result, target ions in the solution can be reversibly placed and released, thus realizing the enrichment and recycling of ions in the solution. The ESIX technology has the advantages of simple operation, high selectivity, reversible process and no secondary pollution. It is a novel environment-friendly and efficient separation technology, and its main driving force is the electrode potential. Moreover, a chloride ion type ESIX function electrode adopted for use in the present invention can be recycled many times.

The present invention provides a device for removing chloride ions in desulfurized wastewater by electrochemical coupling, including an electrolyte tank, two electrodes and two direct current (DC) circuits;

whereby: the electrolyte tank can be used as a separator in a separation process and as an electrode regenerator in an electrode regeneration process, the two electrodes are a hydrogen evolution electrocatalysis function electrode and an ESIX function electrode respectively, and the electrodes are connected with each other by a conductor, e.g., a wire; the two DC circuits have opposite electric field directions and are alternately used in the separation process and the electrode regeneration process respectively; the bottom of the electrolyte tank is provided with a purified high-concentration chloride ion wastewater inlet and a flocculation product outlet, and the top is provided with a dechlorination treatment water outlet and a hydrogen collecting port; and the electrolyte tank is connected to an electrode regeneration liquid storage tank through a pump and a pipeline.

In the foregoing device according to this invention, the ESIX function electrode may be obtained by depositing or coating an ESIX functional material with high selectivity and high flux for chloride ions, such as chlorine doped polypyrrole, on a carbon-based conductive matrix or a metal conductive matrix.

In the foregoing device according to this invention, the hydrogen evolution electrocatalysis function electrode may include a blank electrode plate, such as any of carbon paper, a platinum mesh and graphite paper, and may also include an electrode coated with a hydrogen evolution catalyst material, such as any one or more of a metal oxide, a metal phosphide, a metal sulfide, an alloy and a carbon nitride catalyst.

The present invention also provides a method for removing chloride ions in desulfurized wastewater by electrochemical coupling. The method includes a separation process and an electrode regeneration process; when an ESIX function electrode in the separation process is saturated by adsorption, the electrode needs to be subjected to the electrode regeneration process in situ, and the two processes need to be performed intermittently and repeatedly. The method specifically includes the following steps:

(1) Separation: Install a chloride ion exchange function electrode on an anode; install a hydrogen evolution electrocatalysis function electrode on a cathode; pour purified high-concentration chloride ion wastewater into an electrolyte tank; apply a direct voltage, and perform adsorption by the anode and hydrogen evolution flocculation by the cathode to subject chloride ions to adsorption and flocculation separation; collect hydrogen products and flocculation products generated by the cathode; and discharge a treatment liquid which can be reused after dechlorination.

(2) Electrode regeneration: On the basis of the separation process described above, add an electrode regeneration liquid into an electrolyte tank through a pump, and switch a reverse circuit, so that the electrode saturated by adsorption realizes in-situ desorption regeneration.

In step (1), applying a DC causes the chloride ions in the desulfurized wastewater to migrate to the anode under the action of an electric field, and they are adsorbed into pores of the ESIX function electrode with selectivity for the chloride ions, thus realizing the adsorption process. However, the following hydrogen evolution reaction occurs at the cathode:

$$2H_2O+2e^-\rightarrow H_2\uparrow+2OH^-$$

After hydrogen is separated out, hydrogen ions on the cathode surface decrease and hydroxide radicals increase, and a large amount of metal ions in the solution bond with locally surplus hydroxide ions and chloride ions according to the following reaction:

$$kM^{j+}+xCl^-+yOH^-\rightarrow M_{jk}Cl_x(OH)_y\downarrow$$

Generated flocculation products settle to a lower layer of the electrolyte tank; and, when the bottom of the electrolyte tank is filled with the floccules, the floccules can be discharged out of the system through filtration.

In step (2), applying the direct current causes the chloride ions in the ESIX function electrode to be desorbed into the regeneration liquid under the action of the electric field, so that the electrode has a function of adsorbing the chloride ions again.

In the foregoing method, after the ESIX function electrode is regenerated, if the electrode regeneration liquid is not saturated, the electrode regeneration liquid can be poured into an electrode regeneration liquid storage tank again by a pump for recycling. If the electrode regeneration liquid is saturated, the processes of adsorption by the anode and hydrogen evolution flocculation separation by the cathode are realized by reversing the circuit, and the chloride ions in the saturated electrode regeneration liquid are separated, so that the chloride ions in the saturated electrode regeneration liquid form to the greatest extent solid phase flocculation products that are discharged out of the system.

Preferably, in the separation process, the voltage is 1-3 V, and the liquid inlet rate of a high-concentration chloride ion wastewater inlet (reference numeral 7 in FIG. 1) is 1-10 L/h.

Preferably, in the electrode regeneration process, the voltage is 0.8-2V; the liquid inlet rate of an electrode regeneration liquid pump I (reference numeral 14 in FIG. 2) is 10-30 L/h; and the liquid inlet rate of an electrode regeneration liquid pump II (reference numeral 15 in FIG. 2) is 20-40 L/h.

Compared with the prior art, the present invention is innovative in that:

(1) The ESIX function electrode can be recycled.

(2) The device is a simple dual-function reactor, which can be used alternately as a separator and an electrode regenerator In the regeneration process of the ESIX function electrode, the electrode docs not need to be taken out, and only an external circuit switch needs to be switched to perform in-situ regeneration and reuse.

(3) When chloride ions in desulfurized wastewater are removed by an electrochemical coupling method, by utilizing the synergistic reinforcement of reactions of an anode and a cathode, the chloride ion removal efficiency and energy utilization efficiency can be improved. Also, most of the chloride ions in the wastewater exist in flocculation products in a solid form, which facilitates recycling. Besides, hydrogen byproducts with high added value can be obtained at the same time, and the operation cost is reduced, thereby effectively improving economic benefits.

(4) No additional chemical reagent needs to be added when high-concentration chloride ion wastewater is treated.

(5) When the high-concentration chloride ion wastewater is treated, metal ions in the wastewater can simultaneously form into flocculation products for treatment.

(6) Expensive consumables such as ion diaphragms are not needed in the treatment process, thus the cost of the approach of the present invention is comparatively low.

(7) The operation is simple and efficient, which is beneficial to industrial production.

Figure 1:
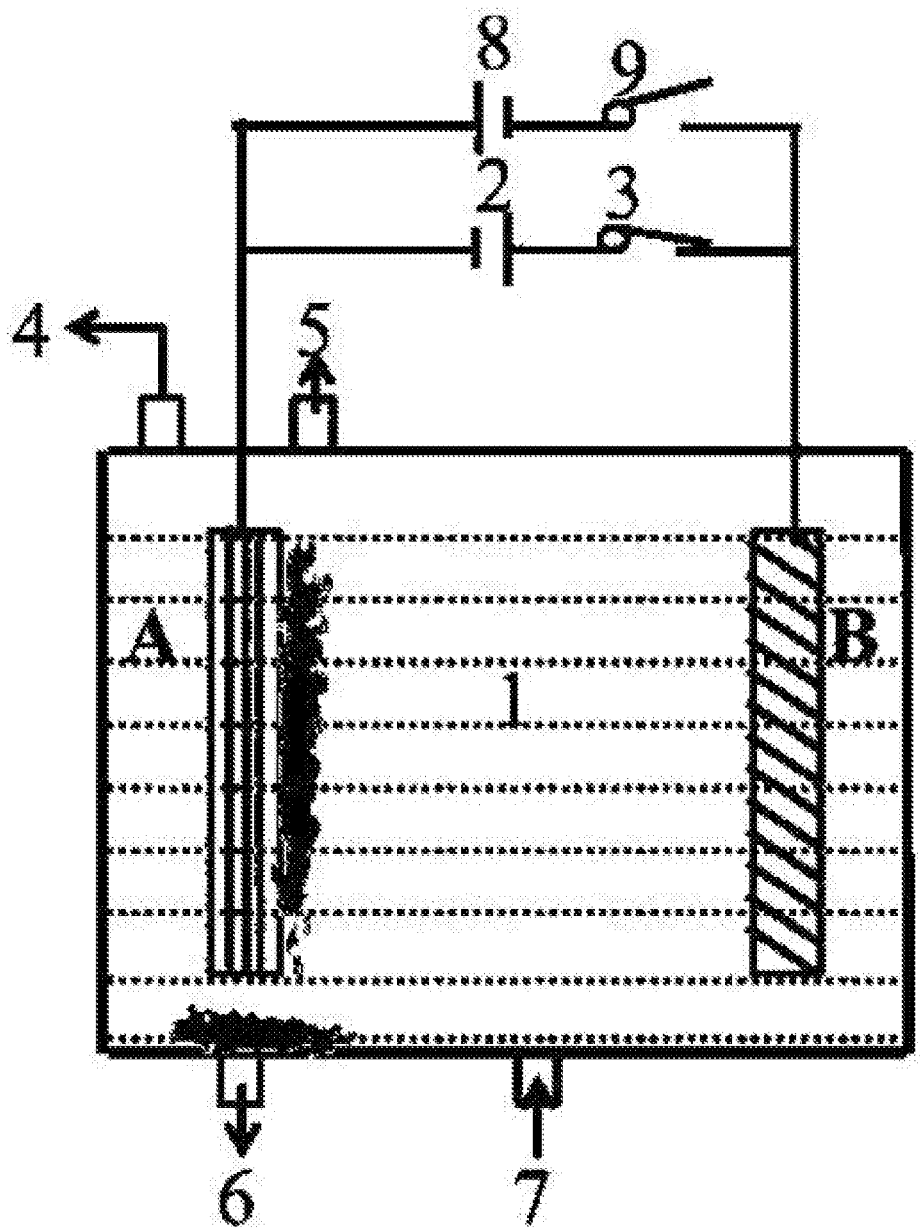
FIG. 1 is a schematic diagram of an apparatus for a separation process according to this invention.

The figures show: hydrogen evolution electrocatalysis function electrode (A), ESIX function electrode (B), electrolyte tank (1), DC power supply I (2), power switch I (3), dechlorination treatment water outlet (4), hydrogen collecting port (5), flocculation product outlet (6), purified high-concentration chloride ion wastewater inlet (7), power switch II (8), power switch II (9), electrode regeneration liquid inlet I (10), electrode regeneration liquid inlet II (11), electrode regeneration liquid outlet I (12), electrode regeneration liquid outlet II (13), electrode regeneration liquid pump I (14); electrode regeneration liquid pump II (15); and electrode regeneration liquid storage tank (16).

DETAILED DESCRIPTION

The present invention is further illustrated by the following examples, but is not limited thereto.

Figure 2:
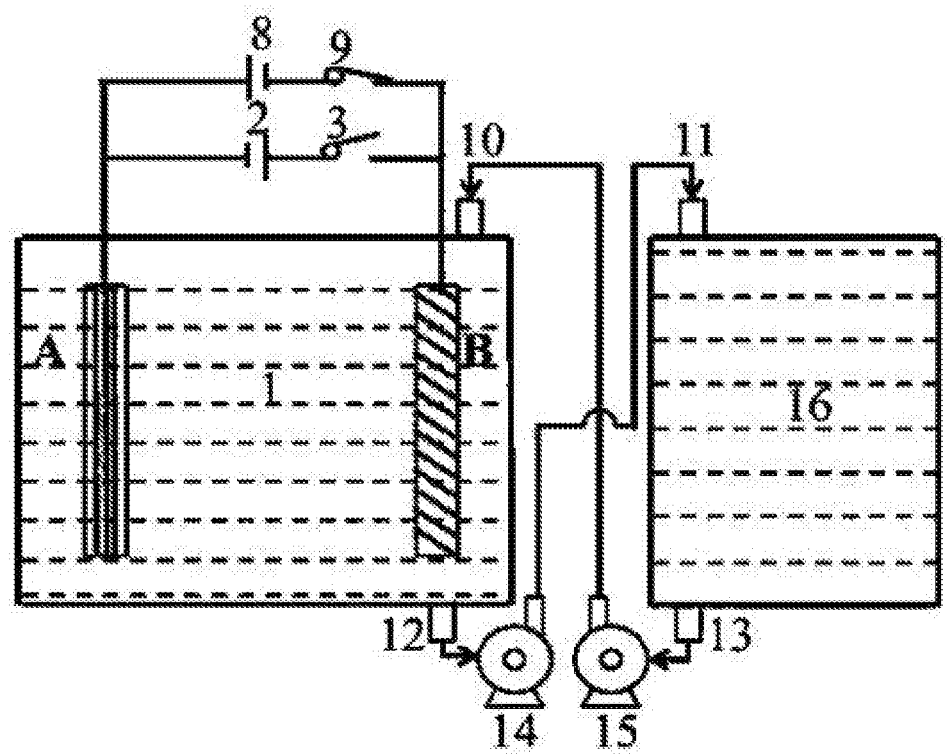
FIG. 2 is a schematic diagram of an apparatus for an electrode regeneration process according to this invention.

In the examples, an experimental device shown in FIGS. 1 and 2 is adopted, and the device includes an electrolyte tank (1), two electrodes and two DC circuits.

The electrolyte tank (1) can be used as a separator in a separation process and can be used as an electrode regenerator in an electrode regeneration process. The two electrodes are a hydrogen evolution electrocatalysis function electrode (A) and an electrochemically switched chloride ion exchange function electrode (B) respectively. The two DC circuits have opposite electric field directions and are used in a switched manner in the separation process and the electrode regeneration process respectively. The bottom of the electrolyte tank (1) is provided with a purified high-concentration chloride ion wastewater inlet (7) and a flocculation product outlet (6). The top is provided with a dechlorination treatment water outlet (4) and a hydrogen collecting port (5). The two electrodes are connected by a conductor, e.g., a wire; and the electrolyte tank (1) is connected to an electrode regeneration liquid storage tank (16) through a pump and a pipeline.

In the electrode regeneration process, an electrode regeneration liquid outlet I (12) at the bottom of the electrolyte tank (1) is connected to an electrode regeneration liquid inlet II (11) at the top of the electrode regeneration liquid storage tank (16) through an electrode regeneration liquid pump I (14). An electrode regeneration liquid outlet II (13) at the bottom of the electrode regeneration liquid storage tank (16) is connected to an electrode regeneration liquid inlet I (10) at the top of the electrolyte tank (1) through an electrode regeneration liquid pump II (15).

The removal of chloride ions in desulfurized wastewater using the foregoing device is further described below by specific examples.

Example 1

As shown in FIG. 1, a device for removing chloride ions in desulfurized wastewater by electrochemical coupling is provided. The hydrogen evolution electrocatalysis function electrode (A) is a $CO_3O_4$/Ti electrode, and the electrochemically switched chloride ion exchange function electrode (B) is a PPy ion exchange function electrode containing chloride ion imprinted vacancies. 1.0 L of purified desulfurized wastewater from a real power plant was added to an electrochemical coupling separator (1), and 0.5 M $Na_2SO_4$ regeneration solution was added to an electrode regeneration liquid storage tank (16) The tank voltage used in the separation process was 1.5 V, and the separation removal time was 3 hours. The tank voltage used in the electrode regeneration process was 1 V and the regeneration time was 2 hours.

The initial concentration of chloride ions in the industrial wastewater was 9000 ppm, and the concentration of chloride ions in the treated liquid following treatment was 3000 ppm. The flocculent precipitate was about 1.2 g, and the removal rate of chloride ions in the electrode regeneration liquid reached 98%.

Example 2

As shown in FIG. 1, a device for removing chloride ions in desulfurized wastewater by electrochemical coupling is provided. The hydrogen evolution electrocatalysis function electrode (A) is a blank carbon paper electrode, and the electrochemically switched chloride ion exchange function electrode (B) is a PPy ion exchange function electrode containing chloride ion imprinted vacancies. 1.0 L of purified desulfurized wastewater from a real power plant was added to an electrochemical coupling separator (1), and 0.5 M $Na_2SO_4$ regeneration solution was added to an electrode regeneration liquid storage tank (16). The tank voltage used in the separation process was 1.5 V, and the separation removal time was 3 hours. The tank voltage used in the electrode regeneration process was 1 V and the regeneration time was 2 hours The initial concentration of chloride ions in the industrial wastewater was 9000 ppm, and the concentration of chloride ions in the treated liquid following treatment was 4500 ppm. The flocculent precipitate was about 0.78 g, and the removal rate of chloride ions in the electrode regeneration liquid reached 95%.

Example 3

As shown in FIG. 1, a device for removing chloride ions in desulfurized wastewater by electrochemical coupling is provided. The hydrogen evolution electrocatalysis function electrode (A) is a molybdenum disulfide electrode, and the electrochemically switched chloride ion exchange function electrode (B) is a PPy ion exchange function electrode containing chloride ion imprinted vacancies. 1.0 L of simulated wastewater (with a Ca concentration of 2000 ppm and an Mg concentration of 4000 ppm) was added ta an electrochemical coupling separator (1), and 0.5 M $Na_2SO_4$ regeneration solution was added to an electrode regeneration liquid storage tank (16). The tank voltage used in the separation process was 1.5 V, and the separation removal time was 3 hours. The tank voltage used in the electrode regeneration process was 1 V and the regeneration time was 2 hours.

The initial concentration of chloride ions in the industrial wastewater was 10000 ppm, and the concentration of chloride ions in the treated liquid following treatment was 2500 ppm. The flocculent precipitate was about 1.47 g, and the removal rate of chloride ions in the electrode regeneration liquid reached 99%.

What is claimed is:

1. A method for removing chloride ions in desulfurized wastewater by electrochemical coupling using a device comprising an electrolyte tank having a top and a bottom, two electrodes and two direct current (DC) circuits;
    wherein the electrolyte tank can be used as a separator in a separation process and used as an electrode regenerator in an electrode regeneration process; the two electrodes are a hydrogen evolution electrocatalysis function electrode and an electrochemically switched ion exchange (ESIX) function electrode respectively, and the electrodes are connected with each other by a wire; the two DC circuits have opposite electric field directions and can alternately be used in the separation process and the electrode regeneration process respectively; the bottom of the electrolyte tank is provided with a purified high-concentration chloride ion wastewater inlet and a flocculation product outlet; and the top is provided with a dechlorination treatment water outlet and a hydrogen collecting port, in the electrode regeneration process, the electrolyte tank is connected to an electrode regeneration liquid storage tank through a pump and a pipeline, and the ESIX function electrode comprises an ESIX functional material with high selectivity and high flux for chloride ions coated or deposited on a carbon-based conductive matrix or a metal conductive matrix, and the ESIX functional material comprises chlorine doped polypyrrole; and wherein the method comprises a separation process and an electrode regeneration process such that when said ESIX function electrode in the separation process is saturated by adsorption, the ESIX function electrode is subjected to an electrode regeneration process in situ, and these two processes are performed intermittently and repeatedly; the method comprising the following steps:

(a) the separation process comprising: installing a chloride ion exchange function electrode on an anode of the electrolyte tank; installing a hydrogen evolution electrocatalysis function electrode on a cathode of the electrolyte tank; pouring purified high-concentration chloride ion wastewater into the electrolyte tank; applying a direct voltage between the anode and the cathode of the electrolyte tank; performing adsorption by the anode and hydrogen evolution flocculation by the cathode to subject chloride ions to adsorption and flocculation separation; collecting hydrogen byproducts and flocculation products generated by the cathode; and discharging a treated liquid which can be reused after dechlorination; and (b) the electrode regeneration process comprising: using the previously-described separation process devices, adding an electrode regeneration liquid into the electrolyte tank through a pump, and switching to a reverse circuit, so that the electrode saturated by adsorption realizes in-situ desorption regeneration.

2. A method according to claim 1 for removing chloride ions in desulfurized wastewater by electrochemical coupling wherein the hydrogen evolution electrocatalysis function electrode comprises a blank electrode plate or an electrode coated with a hydrogen evolution catalyst material.

3. A method according to claim 2 for removing chloride ions in desulfurized wastewater by electrochemical coupling wherein the blank electrode plate comprises a member selected from the group consisting of carbon paper, a platinum mesh and graphite paper; and the hydrogen evolution catalyst material comprises a member selected from the group consisting of a metal oxide, a metal phosphide, a metal sulfide, an alloy and a carbon nitride catalyst.

4. A method according to claim 1 for removing chloride ions in desulfurized wastewater by electrochemical coupling wherein in the electrode regeneration process, an electrode regeneration liquid outlet I at the bottom of the electrolyte tank is connected to an electrode regeneration liquid inlet II at the top of the electrode regeneration liquid storage tank through an electrode regeneration liquid pump I; and an electrode regeneration liquid outlet II at the bottom of the electrode regeneration liquid storage tank is connected to an electrode regeneration liquid inlet I at the top of the electrolyte tank through an electrode regeneration liquid pump II.

5. The method for removing chloride ions in desulfurized wastewater by electrochemical coupling according to claim 1, wherein step (a) comprises: a DC that causes the chloride ions in the desulfurized wastewater to migrate to the anode under the action of an electric field where they are adsorbed into pores of the ESIX function electrode with selectivity for the chloride ions, thus realizing the adsorption process while a hydrogen evolution reaction occurs at the cathode; following hydrogen separation, allowing hydrogen ions on the cathode surface to decrease and hydroxide radicals to increase, and metal ions in the solution to bond with locally surplus hydroxide ions and chloride ions generating flocculation products that settle to a lower layer of the electrolyte tank; and, when the bottom of the electrolyte tank is filled with the floccules, discharging the floccules out of the system through filtration; and further wherein step (b) comprises: allowing the chloride ions in the ESIX function electrode to be desorbed into the regeneration liquid under the action of the electric field so that the electrode functions to adsorb chloride ions again.

6. The method for removing chloride ions in desulfurized wastewater by electrochemical coupling according to claim 2, wherein step (a) comprises: a DC that causes the chloride ions in the desulfurized wastewater to migrate to the anode under the action of an electric field where they are adsorbed into pores of the ESIX function electrode with selectivity for the chloride ions, thus realizing the adsorption process while a hydrogen evolution reaction occurs at the cathode; following hydrogen separation, allowing hydrogen ions on the cathode surface to decrease and hydroxide radicals to increase, and metal ions in the solution to bond with locally surplus hydroxide ions and chloride ions generating flocculation products that settle to a lower layer of the electrolyte tank; and, when the bottom of the electrolyte tank is filled with the floccules, discharging the floccules out of the system through filtration; and further wherein step (b) comprises: allowing the chloride ions in the ESIX function electrode to be desorbed into the regeneration liquid under the action of the electric field so that the electrode functions to adsorb chloride ions again.

7. The method for removing chloride ions in desulfurized wastewater by electrochemical coupling according to claim 3, wherein step (a) comprises: a DC that causes the chloride ions in the desulfurized wastewater to migrate to the anode under the action of an electric field where they are adsorbed into pores of the ESIX function electrode with selectivity for the chloride ions, thus realizing the adsorption process while a hydrogen evolution reaction occurs at the cathode; following hydrogen separation, allowing hydrogen ions on the cathode surface to decrease and hydroxide radicals to increase, and metal ions in the solution to bond with locally surplus hydroxide ions and chloride ions generating flocculation products that settle to a lower layer of the electrolyte tank; and, when the bottom of the electrolyte tank is filled with the floccules, discharging the floccules out of the system through filtration; and further wherein step (b) comprises: allowing the chloride ions in the ESIX function electrode to be desorbed into the regeneration liquid under the action of the electric field, so that the electrode functions to adsorb chloride ions again.

8. The method for removing chloride ions in desulfurized wastewater by electrochemical coupling according to claim 4, wherein step (a) comprises: a DC that causes the chloride ions in the desulfurized wastewater to migrate to the anode under the action of an electric field where they are adsorbed into pores of the ESIX function electrode with selectivity for the chloride ions, thus realizing the adsorption process while a hydrogen evolution reaction occurs at the cathode; following hydrogen separation, allowing hydrogen ions on the cathode surface to decrease and hydroxide radicals to increase, and metal ions in the solution to bond with locally surplus hydroxide ions and chloride ions generating flocculation products that settle to a lower layer of the electrolyte tank; and, when the bottom of the electrolyte tank is filled with the floccules, discharging the floccules out of the system through filtration; and further wherein step (b) comprises: allowing the chloride ions in the ESIX function electrode to be desorbed into the regeneration liquid under the action of the electric field so that the electrode functions to adsorb chloride ions again.

9. The method for removing chloride ions in desulfurized wastewater by electrochemical coupling according to claim 1, wherein after the ESIX function electrode is regenerated; (a) if the electrode regeneration liquid is not saturated, the electrode regeneration liquid is poured into an electrode regeneration liquid storage tank again by a pump for recycling; or (b) if the electrode regeneration liquid is saturated, the processes of adsorption by the anode and hydrogen evolution flocculation separation by the cathode are realized by reversing the circuit, and the chloride ions in the saturated electrode regeneration liquid are separated, so that the chloride ions in the saturated electrode regeneration liquid form solid phase flocculation products that are discharged out of the system.

10. The method for removing chloride ions in desulfurized wastewater by electrochemical coupling according to claim 1, wherein, in the separation process, the voltage is 1-3 V and the liquid inlet rate of a high-concentration chloride ion wastewater inlet is 1-10 L/h; and also in the electrode regeneration process, the voltage is 0.8-2V, the liquid inlet rate of an electrode regeneration liquid pump I is 10-30 L/h, and the liquid inlet rate of an electrode regeneration liquid pump II is 20-40 L/h.

* * * * *